United States Patent [19]

Bouteille et al.

[11] 4,245,673
[45] Jan. 20, 1981

[54] PNEUMATIC LOGIC CIRCUIT

[75] Inventors: Daniel Bouteille, Ville d'Avray; Michel Duclos, Verneuil l'Etang; Hugues Marguet, Paris; Michel Nicolas, Plaisir; Eric Petrimaux, Evreux, all of France

[73] Assignee: La Telemechanique Electrique, France

[21] Appl. No.: 15,071

[22] Filed: Feb. 26, 1979

[30] Foreign Application Priority Data

Mar. 1, 1978 [FR] France ............................. 78 07207
Feb. 2, 1979 [FR] France ............................. 79 02737

[51] Int. Cl.³ ......................................... G05D 16/04
[52] U.S. Cl. .............................. 137/884; 137/624.14; 137/885
[58] Field of Search ................. 137/624.14, 884, 885

[56] References Cited

U.S. PATENT DOCUMENTS 3,875,959  4/1975  Bouteille .................. 137/625.14 X Primary Examiner—Gerald A. Michalsky
Attorney, Agent, or Firm—William A. Drucker

[57] ABSTRACT

A sequencing logic circuit comprises a blocking means for preventing phase jumps caused by the untimely presence of a release signal. An inhibitor device is placed on one of the channels feeding a storage relay, placed upstream of said release signal, in such a manner as to prevent the transmission thereto of a pressure for placing it in logic state "1." This inhibitor device is actuated by the release signal and does not permit any communication between the latter and the channel controlled.

11 Claims, 10 Drawing Figures

PNEUMATIC LOGIC CIRCUIT

BACKGROUND OF THE INVENTION

The invention relates to a circuit, for the control of pneumatic logic systems, of the kind having modules each comprising a bistable storage relay with channels connected respectively to a feed of pressure, to an actuating input for placing it in logic state "1," to a second cancelling input for placing it in logic state "0," and to a control output for feeding a user apparatus, and wherein said actuating input is fed by the output of an "AND" gate placed upstream, whilst the cancelling input is fed with signals derived at least from the control output of a storage relay placed downstream, said "AND" gate comprising a first input fed by the control output of a storage relay placed upstream and a second input fed with release signals delivered by a user apparatus controlled by the storage relay placed upstream.

THE PRIOR ART

Such a circuit is known from for example, French Pat. No. 71.35894 of Sept. 29, 1971 in the name of LA TELEMECANIQUE ELECTRIQUE, wherein the application is made to a sequencing logic circuit. The phase modules which compose such a circuit can likewise be used in circuits such as those necessary for counting, for establishment of register, etc.

One of the rare inconveniences which can occur with such circuits arises from the fact that if a release signal, associated with a predetermined operative phase, becomes established before the presentation of an activating signal of said phase, the conditions are then right for the appearance of said activating signal to suddenly cause the actuation of the following operating phase.

If the release signal has been deliberately maintained, or if its maintenance results from conditions which are voluntarily allowed to occur, for example for the setting into motion of a disengagement cycle putting into operation a secondary sequencing circuit a release signal of which is normally established, the phase jump does not then present any inconvenience; if, on the contrary, the presence of the release signal results from blocking of a pneumatic position switch or from any other involuntary circumstance such as the too extended purging of the channel means, this phase jump can have grave consequences.

It has been proposed to solve the problems posed by this untimely operation with the aid of slide means the use of which is limited, because they cannot be used with success in certain types of logic circuits such as for example displacement registers.

OBJECT OF THE INVENTION

The invention accordingly proposed to provide a circuit, and the modules necessary therefor, in which the inconveniences mentioned above are eliminated and wherein consequently the presence of an untimely returned signal is not the cause of a phase jump, and wherein the choice of safety elements introduced into the modules will give the possibility of using the same module in the majority of cases of use desired by the user.

SUMMARY OF THE INVENTION

According to the invention, this result is achieved in that the release signals fed to a pre-determined module are transmitted through a blocking channel to a pneumatic inhibitor circuit, placed on one of the channels, establishing the circulation of fluid towards the storage relay of the said module, and capable of interrupting the flow of fluid thereto, said blocking channel furthermore having no continuity of fluid flow with the channel which it controls, and said inhibitor circuit preventing either the passage of the storage relay to logic state "1" when the presence of the release signal precedes the arrival of a signal for placing the storage relay at logic state "1," or again the appearance of the signal of the control output.

Other objects, features and advantages of the invention, and advantageous methods of carrying it out, will appear from the following description with reference to the drawings.

DESCRIPTION OF THE PREFERRED EMBODIMENT

Figure 1:
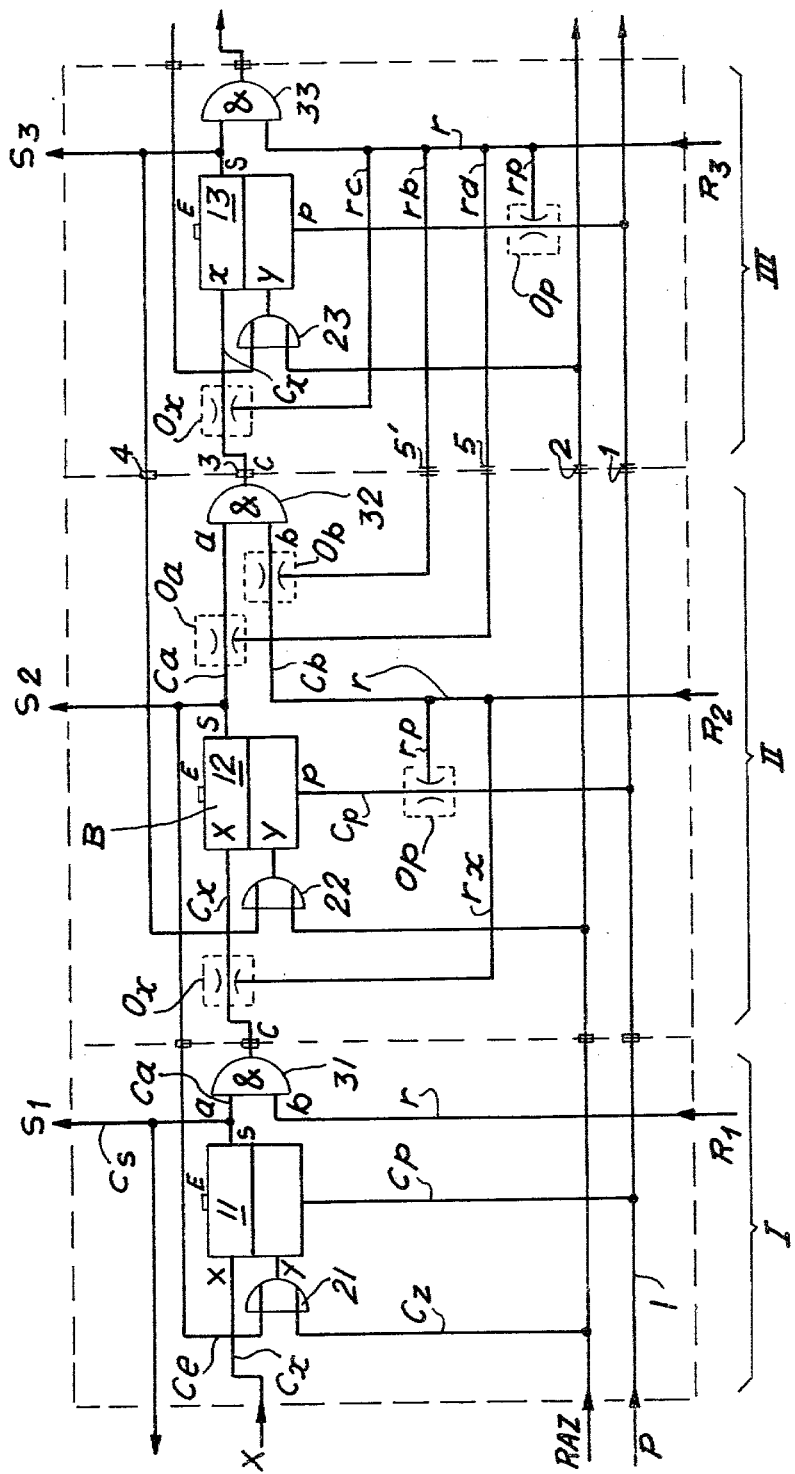
FIG. 1 is a schematic layout of a conventional sequencing device, in which there have been applied supplementary features in accordance with the invention.

In a pneumatic automatic, sequencing circuit such as that illustrated in FIG. 1, there are shown at I, II and III three successive phase modules, each intended for the control of a predetermined operative phase, and associated by juxtapositioning.

The module I, which has been shown in its conventional form, forming part of the prior art, comprises a certain number of elements and of connections which are likewise to be found in the modules II and III which have been made the subject of the improvements of the invention, that is to say:

a channel P for feed of fluid under pressure, a bistable pneumatic storage relay 11, fed under pressure through the channel $C_p$ coupled to the channel P, and having an exhaust outlet E, an actuating input X by which the storage relay will be placed in its logic state "1," causing the emission of an output signal at the point S, coupled to the output channel $C_s$, terminating at $S_1$ at a user apparatus to be controlled, and a cancelling input Y, a pneumatic "OR" logic gate 21 having an output coupled to Y and two inputs one of which is coupled through the channel $C_z$ to a common return-to-zero line R A Z, and the other of which is coupled to the output channel of the storage relay 12 placed downstream, a pneumatic "AND" logic gate 31, having an output C coupled to the channel $C_x$, which communicates with the actuating input of the storage relay 12 placed downstream, and a second input a coupled to the output S of the storage relay 11 and a second input b coupled through the channel r to an external channel, which receives a release pressure signal $R_1$, when the operation undertaken by $S_1$ is carried out and has, for example, actuated a position switch; it will be noted that the pressure signal $R_1$ can itself be the result of a logic operation, of which one of the variables is the release signal provided by said position switch.

All the elements, channels, couplings and signals which have just been described are to be found integrally in the modules II and III placed successively downstream of the module I, but the output and release signals thereof have been provided with an index corresponding to their position in the series, viz, $R_2$, $S_2$ for module II, $R_3$, $S_3$ for module III, etc.

The defect which the invention proposes to remedy can occur if, for example, the release signal $R_2$ is present before the phase advancing signal has been provided by the module I on the channel $C_x$ of module II. In this case, when the storage relay 12 assumes its logic state "1", an output signal appears simultaneously at $S_2$ and at the first input a of the "AND" gate 32; as the second input b of this "AND" gate is already activated by $R_2$, a phase advance signal is going to appear at the output c of the said "AND" gate 32 and is going to place the storage relay 13 in logic state "1," before the operation which is to be carried out by the user apparatus, connected to $S_2$, has had the time to be produced.

It is thus important to ensure that, if a pressure signal is established at $R_2$, the phase jump which has just been described cannot be produced.

For this purpose, four blocking arrangements which are different and which can be used separately, have been shown in FIG. 1, viz,:

in module II, two arrangements each necessitating the putting into operation of an inhibitor circuit $O_x$ or $O_p$ coupled to the channel r by a channel $r_x$ or $r_p$ respectively, which do not emerge from the boundary of the module, indicated by a broken line, in module III, two arrangements each necessitating the putting into operation of a respective inhibitor circuit $O_a$ or $O_b$, coupled to the channel r through a respective channel $r_a$ or $r_b$, which must pass beyond the boundary of the module III to terminate in the module II.

In the case of the module II, the first inhibitor circuit $O_x$ is placed on the channel $C_x$ which feeds the actuating input X of the storage relay 12, while the inhibitor circuit $O_p$ is placed on the channel p which feeds the storage relay.

In the two cases, the inhibitor circuit will act as an interruptor adapted to interrupt the passage of the fluid in the channel with which it is associated, this inhibitor circuit being moreover constructed (as will be seen below) in such a manner that no pneumatic connection can exist between the channel capable of being closed and the blocking channel such as $r_x$ or $r_p$, which causes the operation of the inhibitor circuit.

It is clear that this arrangement, which comes into being either by the closing of the channel $C_x$ or by the lack of pressure feed of the storage relay 12, will prevent the appearance of the output signal of this latter, if an untimely release signal $R_2$ is present before the provision of a phase advance signal through the "AND" gate 31.

In the mode of construction applied to the module III, the respective inhibitor circuits $O_a$ and $O_b$ have been placed on the respective channels $C_a$ and $C_b$ which transport the activation signals of the "AND" gate 32 placed upstream of the storage relay 13 of the module III.

These inhibitor circuits, of which the construction is identical to that described hereinabove, are coupled through the respective locking channels $r_a$ and $r_b$ to the channel r which receives the freeing signal $R_3$.

In this type of construction, the channels $r_a$ and $r_b$ must pass beyond the boundary (shown in broken line) between the module II and the module II, such that at the fluid tight junctions (1, 2, 3 and 4) which serve to transmit from one module to the other, respectively the feed pressure P, the common return-to-zero pressure R A Z, the advance- phase pressure and the cancelling pressure, it is necessary to add a supplementary fluid-tight junction 5 or 5'.

As in the two preceding examples of construction, the presence of an untimely release signal $R_3$ causes either the closing of the channel $C_a$ of module II, or the closing of the channel $C_b$ of the same module; consequently, the connection of the pressure signals to the inputs a and b of the "AND" gate 32 will be possible, and with no output signal appearing at the output C of the "AND" gate 32, the storage relay will not be able to assume its logic state "1." Here again, the measures advocated result in elimination of phase jump.

Figure 3:
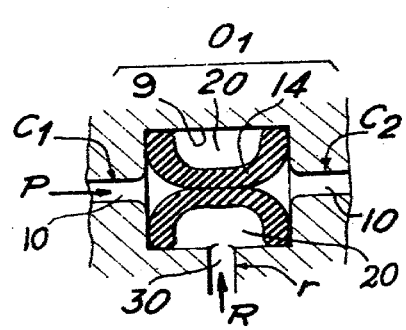
FIGS. 3 and 4 show a first type of inhibitor device, in operation and at rest.
Figure 4:
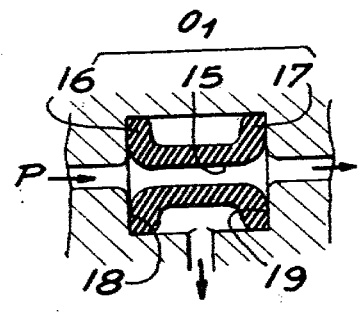

A first method of construction of the inhibitor circuit $O_1$ illustrated in FIGS. 3 and 4, comprises a cylindrical housing 9 placed substantially concentrically to the channel 10 in which the circulation of fluid is to be interrupted.

A sleeve 14 of deformable elastomer is placed in the housing in such a manner that its lateral annular cheeks 16, 17 abut in fluid-tight manner against the plane faces 18, 19 of the housing, and that its central opening 15 is placed opposite to the channel 10. The space 20 comprised between the cylindrical surface 9 and the sleeve 14 is coupled to the blocking channel 30 which has been designated hereinabove by $r_x$, $r_a$ or $r_b$.

When the blocking channel 30 is submitted to a sufficient pressure, the walls of the central opening 15 of the sleeve deform and prevent the circulation of the fluid P, see FIG. 3. In the absence of pressure in the channel 30, the sleeve again assumes, by virtue of its resilience, the open state illustrated in FIG. 4.

Accordingly, no pneumatic connection can exist between the controlled channel 10 and the blocking channel 30.

Figure 5:
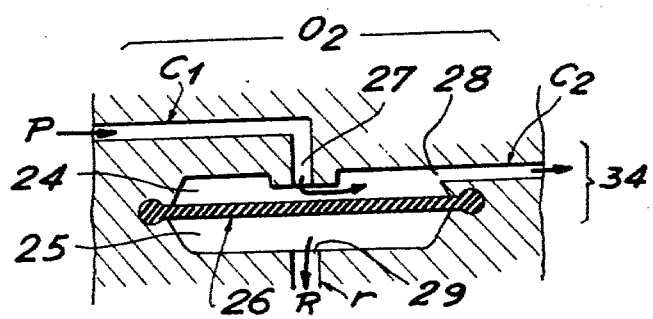
FIG. 5 shows a second type of inhibitor device.

In the example of inhibitor circuit $O_2$, shown in FIG. 5, a deformable membrane 26 divides a housing 34 of the body of the module into two cavities 24, 25.

The cavity 24 has opposite to the membrane, at least one orifice 27 terminating a first portion $C_1$ of channel to be controlled; a second portion $C_2$ of channel to be controlled ends in an orifice 28 in the cavity 24, either opposite to the membrane, or out of reach of this latter.

The blocking channel r itself terminates in an orifice 29 in the second cavity 25. The operation of this inhibitor circuit is based on the deformation of the membrane towards the top of the drawing when a pressure R is applied in the channel r; this deformation produces the closing of the orifice 27 placed opposite to the membrane and, contingently, that of the orifice 28 if this latter is not deliberately placed out of the reach of the movement.

Here again, no pneumatic connection can be established between the controlled channel and the blocking channel.

The inhibitor circuits such as $O_a$, $O_b$ and $O_x$ which do not comprise escape means can be the subject of an improvement intended to assure the decompression of the portion of channel placed between them and the logic element placed downstream thereof and of which the operation must be blocked, that is to say the storage relay.

Figure 2:
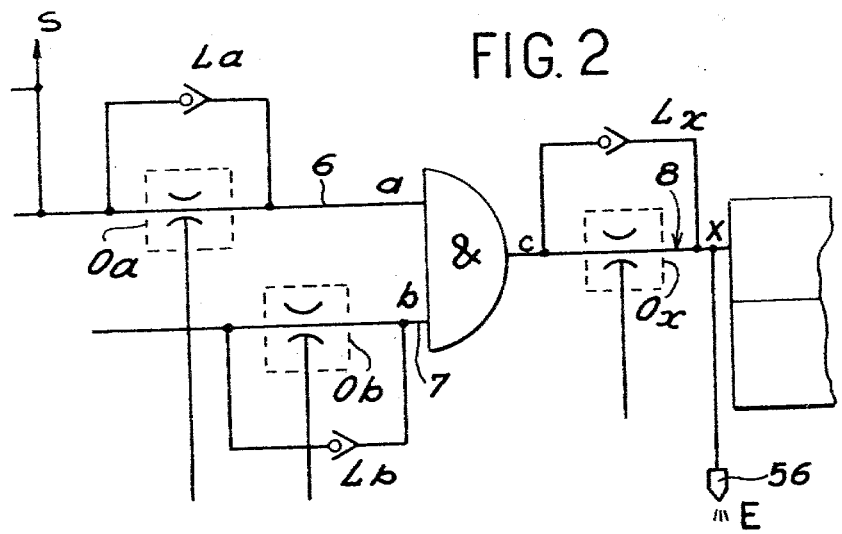
FIG. 2 shows an improvement to the circuit of FIG. 1.

This improvement, illustrated in FIG. 2, consists of disposing in parallel with the inhibitor circuit, a non-return valve such as L or $L_b$ or $L_x$, positioned in such a manner that this latter will permit the respective channel portions 6 and 7 to exhaust themselves respectively towards the outlet S or the channel r, or one of them when it is a case of exhausting the channel portion 8.

The placing of such a non-return valve in parallel with the inhibitor circuit $O_p$ however has no justification, because it cannot present any possibility of circulation of fluid towards the general pressure feed channel P.

Another manner of obtaining the exhausting of the channel portion 8 placed between the inhibitor circuit OX and the input x for placing the memory in logic state "1" is visible in FIG. 2 and consists of coupling this portion to the outlet E through a calibrated orifice 56, the small dimensions of which permit a slight escape permitting, on the one hand, a rise of pressure in said channel portion 8 when a pressure signal is applied thereto (and consequently the putting of the memory into logic state "1"), and on the other hand permitting this channel portion 8 to become slowly decompressed after blocking of the channel going from c to x by the inhibitor device ox, if small flows of fluid under pressure (coming for example from a valve of the memory) are introduced into the said portion.

Figure 7:
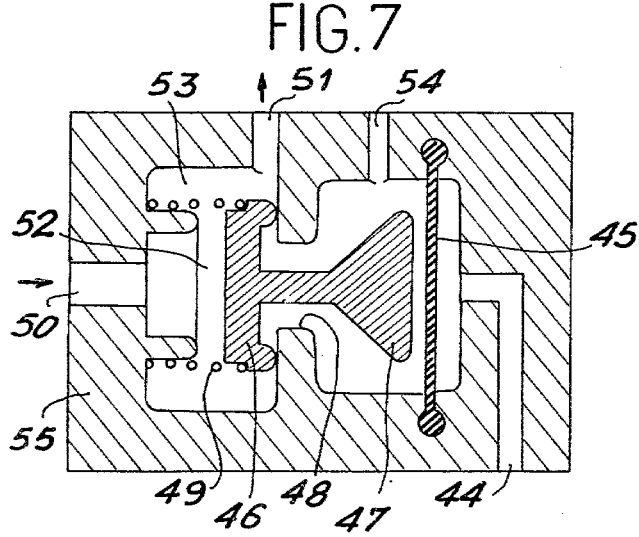
FIG. 7 shows a known "NON"-inhibitor circuit adapted to be applied to the circuit according to the invention.

In another method of construction of the inhibitor circuit placed on the channel passing from c to x, the use of a non-return valve such as $L_x$, or of a calibrated outlet 56, can be dispensed with by making use of a "NON"-inhibition circuit 55 such as that shown in FIG. 7. This known circuit which has been shown in this figure as an independent apparatus, but which in the case of use in accordance with the invention would be incorporated in a module, comprises a control pressure channel 44 adapted to cause the deformation of a membrane 45; the movements of this membrane are transmitted through a pusher element 47 to a valve 46 which closes, in the rest position (that is to say in the absence of control pressure), an orifice 48 under the action of a spring 49. In this position, the valve permits the passage of a fluid from an inlet 50 to an outlet 51 through an opening 52 placed opposite to the face of the valve opposed to that which closes the orifice 48. This orifice 48 furthermore joins the chamber 53, wherein there is placed the valve and in which the inlet 50 and the outlet 51 terminate, to an escape orifice 54.

When the control pressure is applied to the channel 44, the valve 46 displaces towards the left, closes the orifice 52, and provides a connection between the outlet 51 and the escape 54. Here again, there can thus exist no connection between the control channel 44 and the controlled channel constituted by 50, 52, 53, 51.

Figure 8:
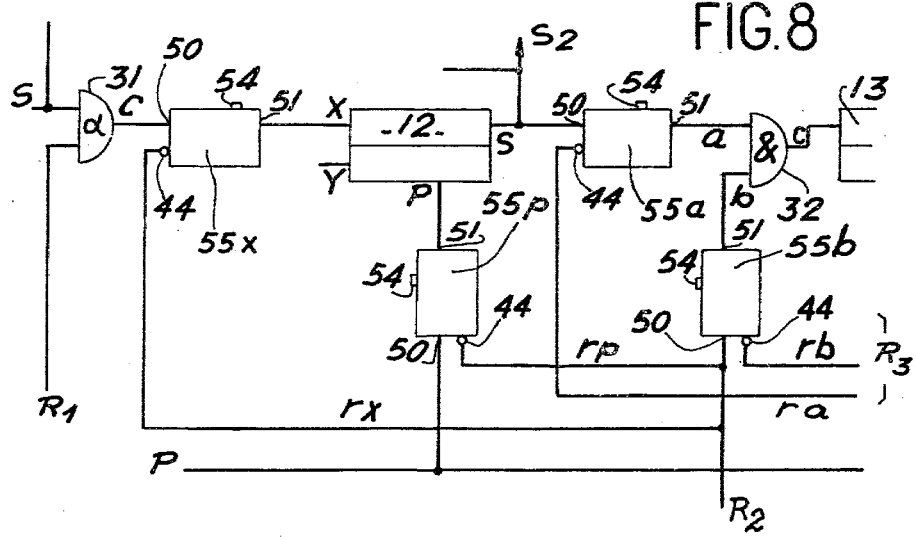
FIG. 8 indicates, in a manner analogous to that of FIG. 1, the disposition of the circuit of FIG. 7.

The positioning of this "NON"-inhibition circuit is carried out according to one of the possibilities $55_x$, $55_a$, $55_b$, $55_p$ shown on the circuit of FIG. 8, which has the same references as those shown in FIG. 1 wherein the circuits are identical.

The action of this non-inhibition circuit is exhibited, upon the occurrence of an untimely release pressure signal $R_2$, by the fact that the input X or the feed p of the storage relay are put in connection with the outlet 54, which prevents the appearance of an output signal at $S_2$; if it is the release pressure signal $R_3$ which is present, it is one of the inputs a or b of the "AND" gate 32 which is coupled to the outlet 54, which prevents the appearance of an output signal at C, and consequently, prevents the placing of the following storage relay in logic state "1." It is evident that in this latter case, the use of a non-return valve is superfluous.

The use of the improvement which has just been described can be applied advantageously to modules with which the probability of malfunction indicated above makes its use necessary.

Nevertheless, there exist numerous cases of application wherein such a precaution is superfluous, and wherein, as a consequence, conventional modules can be used in combination which those which have just been described.

As the association of these different modules must be possible without special intervention by the user, it is important that the putting into place of the inhibitor circuit at the interior of the body of the module does not give rise to a radical change of its shapes, nor a displacement of the inlets of the channels which are to be coupled in the course of associating them with conventional modules.

Figure 6:
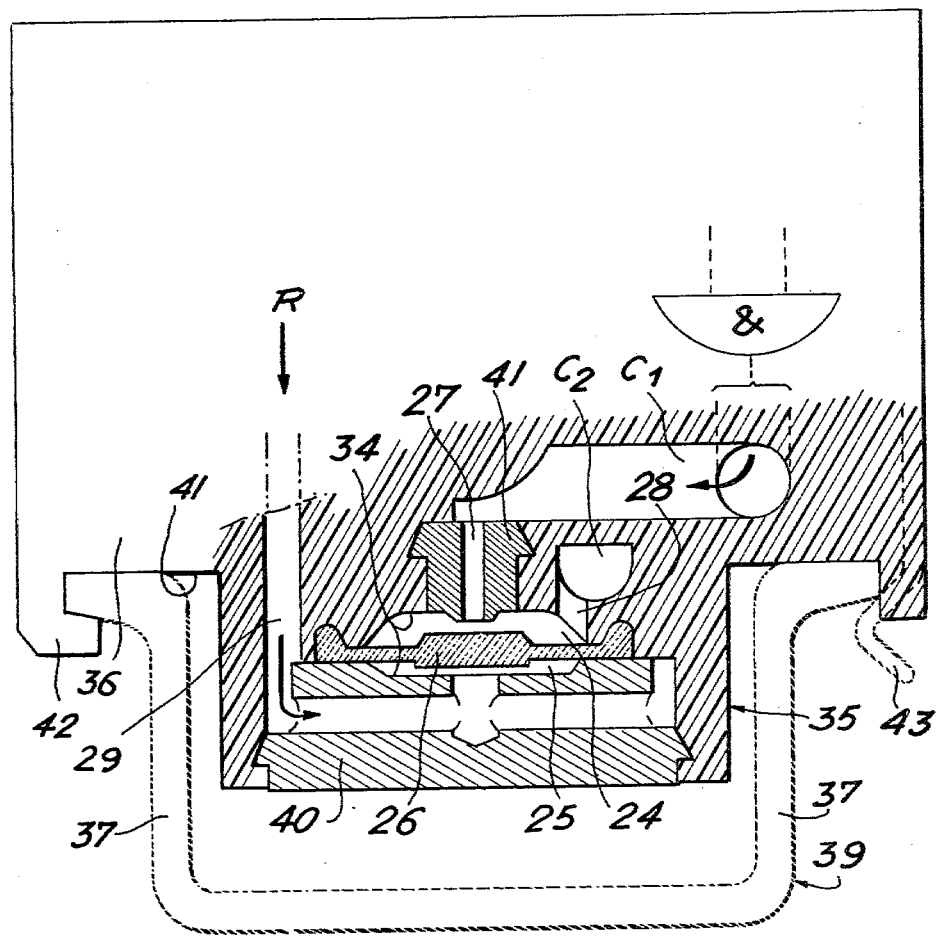
FIG. 6 shows an advantageous method of construction and of placing of the inhibitor of FIG. 5 in a module.

According to an advantageous method of construction illustrated in FIG. 6, the base 36 which constitutes the fixing element of the module, is extended by a portion 35 serving to receive the cavities 25, 24, the channels 28, 29 which end therein, and the membrane 26 of an inhibitor circuit of the type described with reference to FIG. 5.

This portion is disposed under the fixing surface 41 of the base which is engaged on a profiled rail 39 by engaging members 42, 43 and which is placed between the parallel arms 38, 37 of the said profile.

In all of the cases of use which have been described, where the use is made of an inhibitor circuit in accordance with any one of FIGS. 3, 4 or 7, it is important that the conditions of pressure thresholds necessary for efficient operation shall be respected when the untimely release signal is in the course of disappearing.

Figure 9:
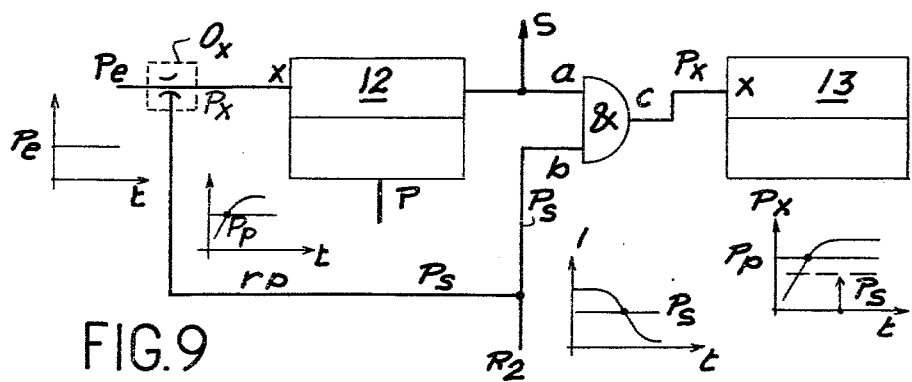
FIG. 9 indicates the pressure threshold conditions which must be respected by the logic elements of an automatic circuit in accordance with the invention.

Referring to FIG. 9, this condition is exhibited by the fact that, when the release pressure $R_2$ diminishes to a value $P_s$ which places in its open condition the inhibitor circuit $O_x$ placed before the storage relay 12 then receiving the developing pressure $P_x$, this pressure $P_s$ must be lower than the value $P_p$ of the pressure $P_x$ which it is necessary to apply to the input X of the storage relay 13 in order to place it in logic state "1."

Figure 10:
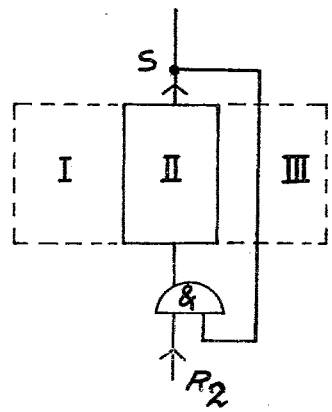
FIG. 10 shows a complement to the logic circuit intended to prevent the action of the inhibitor circuit.

If, for special reasons, it becomes necessary to impart again, to the circuits in accordance with the invention, the properties of previous circuits, it is necessary only to feed the input of the module intended to receive the freeing pressure signal through the output of an "AND" gate of which one of the inputs would receive said release signal, and of which the other input would receive the output signal of the said module as can be seen in FIG. 10.

I claim:

1. In a circuit for the control of pneumatic logic systems with modules each including a bistable storage relay having channels connected respectively to a pressure feed, to an actuating input for putting it into logic state "1," to a second cancelling input for placing it in logic state "0," and to a control output for feeding a user apparatus, and wherein said actuating input is fed by the output of an "AND" gate placed upstream, and the cancelling input is fed by signals derived at least from the control output of a storage relay placed downstream, said "AND" gate comprising a first input fed by the control output of a storage relay placed upstream and a second input fed by release signals delivered by a user apparatus controlled by the storage relay placed upstream, the improvement that the release signals fed to a module are transmitted through a blocking channel to a pneumatic inhibitor circuit placed in one of the channels establishing circulation of fluid towards the storage relay of said module, and adapted to interrupt the circulation of fluid thereto, said blocking channel having no fluid flow path connection with the channel which it controls, and said inhibitor circuit preventing selectively (i) the passage of the storage relay into its logic state "1" when the presence of the release signal precedes the arrival of a signal for placing in logic state "1" the storage relay situated downstream of said "AND" gate, or (ii) the appearance of the signal of the control output.

2. A circuit, according to claim 1 wherein the inhibitor circuit carries out the function of an exhaustless valve the closing and the opening of which are engendered respectively by the presence and absence of a release pressure signal.

3. A circuit, according to claim 2, wherein the channel controlled by the inhibitor device is the pressure feed channel of the storage relay.

4. A circuit, according to claim 2 wherein the controlled channel is one of the channels connected to one of the inputs, or the channel connected to the output, of the "AND" gate placed downstream of the storage relay.

5. A circuit, according to claim 4 wherein, in parallel with the inhibitor device there is placed, on the controlled channel, a non-return valve disposed in such a manner as to permit the decompression of the portion of the controlled channel placed between said device and the storage relay.

6. A circuit, according to claim 2, wherein the inhibitor circuit comprises a deformable sleeve having a channel placed in series with the channel to be controlled, and two annular cheeks bearing on the transversal walls of a cylindrical housing in which the blocking channel terminates.

7. A circuit, according to claim 2, wherein the inhibitor circuit comprises and includes a housing divided into two isolated cavities by a deformable membrane and wherein two successive portions of the controlled channel terminate in the first cavity through respective orifices at least one of which is placed opposite to said membrane, and wherein the blocking channel opens into the second cavity.

8. A circuit, according to claim 7, wherein the housing is placed on one portion of the module which is disposed between the arms of a metal element on which said module is fixed.

9. A circuit, according to claim 2, wherein the portion of channel placed between an inhibitor circuit and the actuating input of the storage relay is connected to the escape through a calibrated passage permitting a slow decompression of said portion.

10. A circuit, according to claim 1, wherein (a) the inhibitor circuit is constituted by a "NON"-inhibition gate comprising a valve placed between two orifices connected respectively to the input of fluid to be controlled and to an outlet, and wherein (b) the chamber in which said valve and said orifices are disposed is connected to the output of the fluid to be controlled, and wherein (c) the blocking channel causes the deformation of a membrane the movements of which resulting therefrom cause the displacement of the valve upon meeting a resilient member.

11. A circuit, according to claim 1, wherein the threshold of blocking pressure, for which the inhibitor member becomes in the open state, is lower than the threshold of pilot pressure for which the storage relay assumes its logic state "1."

* * * * *

UNITED STATES PATENT AND TRADEMARK OFFICE
CERTIFICATE OF CORRECTION

PATENT NO. : 4,245,673

DATED : January 20, 1981

INVENTOR(S) : Daniel Bouteille et al.

It is certified that error appears in the above—identified patent and that said Letters Patent is hereby corrected as shown below:

On the Title page, add Item [73] to read:
Assignee: La Telemecanique Electrique, France Signed and Sealed this First Day of December 1981

[SEAL]

Attest:

GERALD J. MOSSINGHOFF

Attesting Officer     Commissioner of Patents and Trademarks